United States Patent [19]

Mogul

[11] Patent Number: 5,253,353

[45] Date of Patent: Oct. 12, 1993

[54] SYSTEM AND METHOD FOR EFFICIENTLY SUPPORTING ACCESS TO I/O DEVICES THROUGH LARGE DIRECT-MAPPED DATA CACHES

[75] Inventor: Jeffrey C. Mogul, Menlo Park, Calif.

[73] Assignee: Digital Equipment Corporation, Maynard, Mass.

[21] Appl. No.: 459,445

[22] Filed: Jan. 2, 1990

[51] Int. Cl.$^5$ .................... G06F 12/08; G06F 13/00
[52] U.S. Cl. ...................... 395/425; 364/DIG. 1; 364/DIG. 2; 364/243.44; 364/243.45; 364/243.6; 364/245.6
[58] Field of Search ... 364/200 MS File, 900 MS File; 395/400 MS File, 425 MS File

[56] References Cited

U.S. PATENT DOCUMENTS 4,802,085  1/1989  Levy et al. ........................ 395/375

OTHER PUBLICATIONS

Cousins, R., "DMA Considerations on RISC Workstations," *Computer Architecture News*, vol. 17, No. 5, Sep. 1989, pp. 16-23.

Tehranian, M. T., "Twin Cache Tags Enable Concurrent Micro/DMA Processing," *Computer Design*, vol. 24, No. 6, Jun. 1985, pp. 157-159.

Peterson, "System-Level Concerns Set Performance Gains," *High Performance Systems*, vol. 10, No. 9, Sep. 1989, pp. 71-77.

*Primary Examiner*—Joseph L. Dixon
*Assistant Examiner*—Reba I. Elmore
*Attorney, Agent, or Firm*—Flehr, Hohbach, Test, Albritton & Herbert

[57] ABSTRACT

A data processing system (10) includes a CPU (12) connected to a direct-mapped cache (14) by address bus (16) and data bus (18). The cache (14) includes a first-level cache (20) connected to a second-level cache (22) by address bus (24) and data bus (26). The second-level cache (22) of the cache (14) is connected to address bus (28) and data bus (30) by address bus (32) and data bus (34). The address and data busses (28) and (30) are connected to memory (36) and I/O device (41) by address bus (40), data bus (42), address bus (44) and data bus (46), respectively. In the system (10), I/O interface (38) decodes physical memory addresses and responds to addresses in specific ranges using first and second addresses alternately, which are chosen to collide in the data cache (14). I/O software alternates between the two addresses instead of alternating between a device register address and a reserved-region address as in prior art systems.

19 Claims, 5 Drawing Sheets

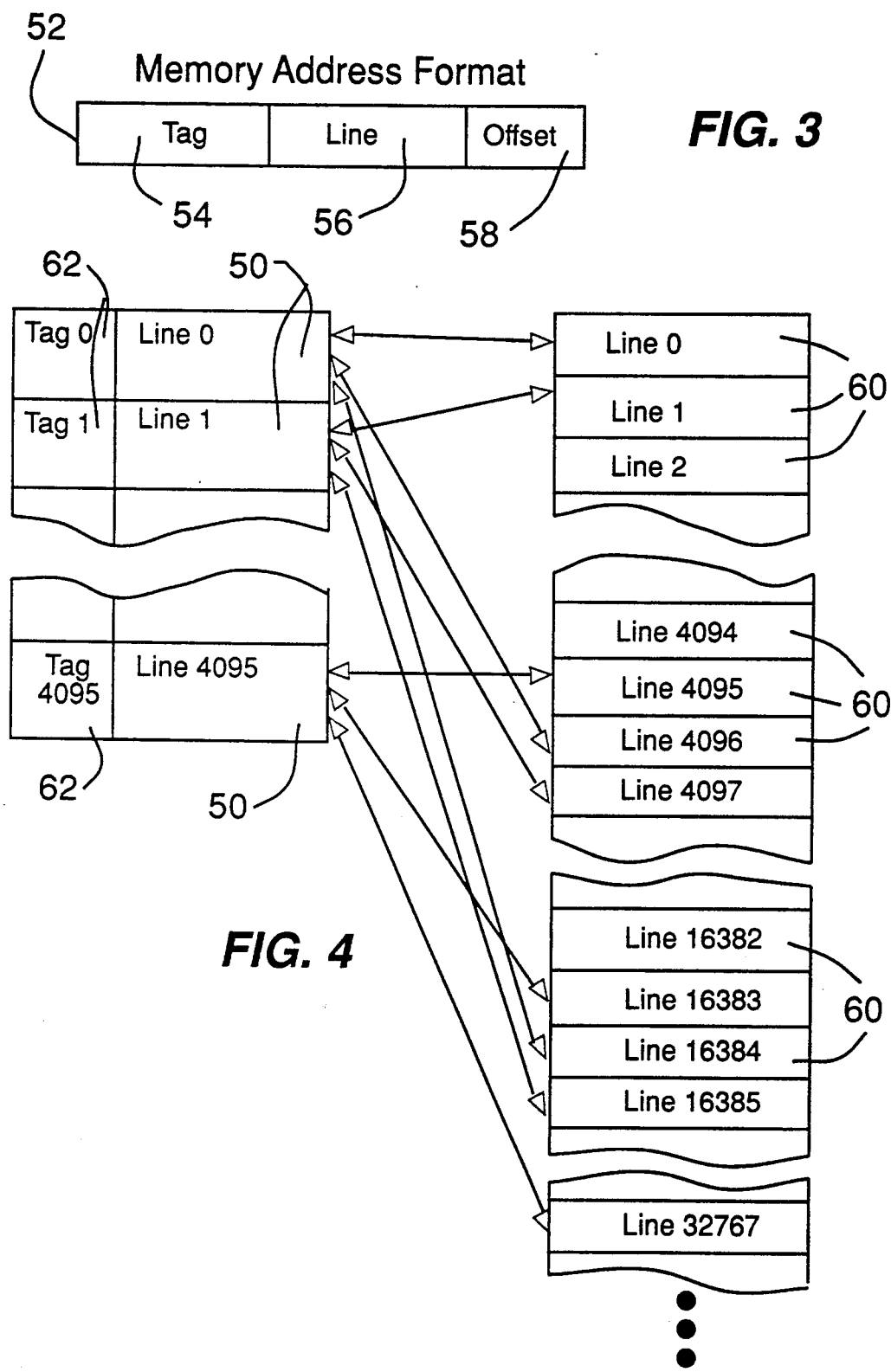

SYSTEM AND METHOD FOR EFFICIENTLY SUPPORTING ACCESS TO I/O DEVICES THROUGH LARGE DIRECT-MAPPED DATA CACHES

BACKGROUND OF THE INVENTION

1. Field of the Invention

The present invention relates generally to a system and method for improving the efficiency of programmed input/output (PI/O) and polling of input/output (I/O) interfaces in a system with large direct-mapped data caches. More particularly, it relates to such a system and method which does not require the use of explicit cache management instructions. Most especially, the invention relates to such a system and method which combines use of direct-mapped caches, a large number of cache lines, high cache miss penalties relative to instruction times, and a lack of direct memory access I/O.

2. Description of the Prior Art

There are several ways to execute I/O operations in a computer system. One which is often attractive is called "memory-mapped" I/O, where I/O device registers appear in the same physical address space as main memory, and may thus be accessed via normal load/-store instructions. Memory mapped I/O devices typically decode physical memory addresses and respond to addresses in specific ranges.

In processors with data caches, one problem with this approach is that the goal of the cache, which is to suppress references to main memory, conflicts with the goal of instructions used to access the I/O device registers, which is to cause an I/O access for every load or store instruction. Another way of stating this problem is that software which is polling an I/O device register must guarantee that the polled address is not valid in the data cache, or the software will not see the actual register value.

Typical ways of dealing with this problem are:

Non-cached regions of physical address space for I/O device registers; the cache is disabled.

Explicit cache management operations where the I/O software can ask that a particular cache line be invalidated, possibly causing a write-back.

Indirect cache management instructions useful with direct-mapped caches, where the software generates a reference to a region of the physical address space known to collide with the cache line being "managed," thus causing the line to be invalidated. This other region can be called a "reserved" region, although it might be used independently for normal memory.

A current trend in processor design is changing several system parameters. Cache lines are getting larger. Next generation systems may have a 256 byte second-level cache line. This implies the use of write-back rather than write-through caches. Memory latencies are getting longer in relation to instruction rate. The cache refill time on the next generation systems might take as long as 200 instruction cycles.

These changes affect the performance of traditional means of dealing with the memory mapped I/O problem. Using uncached addresses is simple, but because it generates a cache miss for every I/O instruction, bandwidth for programmed I/O (PI/O) data transfer is reduced to a tiny fraction of the memory system bandwidth. In the next generation systems, this fraction might be 1/32 of the basic bandwidth.

Explicit cache management instructions can provide accurate control over the disposition of cache lines, but create some additional complexity in the central processing unit (CPU) and cache implementations, and are not present in all architectures. Implicit cache management suffers from high latencies because, in general, it requires a reference to the reserved region for each reference to an I/O register. It thus requires two cache misses and refills per I/O reference. One can do better for PI/O data transfer by making the I/O device's data buffer register as wide as a cache line. Then, almost half of the memory system bandwidth is available for data transfer. The other half is still used for refilling from the reserved region. It is clear from this discussion that improvement is required in the traditional means of dealing with memory mapped I/O for use in next generation computer systems.

SUMMARY OF THE INVENTION

A system for access to I/O devices through large direct-mapped caches in accordance with this invention has a central processing unit, a main memory, at least one input/output device and a direct-mapped cache connected between the central processing unit and the main memory and between the central processing unit and the at least one input/output device. The at least one input/output device has at least one register that it is addressable with a first address and a second address, chosen to collide in the direct-mapped cache. As used herein, the term "collide" means that the two addresses both map to the same word in a cache. The cache cannot simultaneously contain the contents of both memory locations at the same word. The direct-mapped cache, the main memory and the at least one input/output device are addressed by means of addresses having a common form. The central processing unit operated under control of an input/output program to address the at least one input/output device with the first and second addresses chosen to collide in the direct-mapped cache in alternating fashion. This allows each cache-miss, filled from a register of the input/output device, to convey useful information, while guaranteeing that the value stored in the cache is not "stale", i.e., maintaining current information in the cache.

A method for access to I/O devices through large direct-mapped caches in accordance with this invention includes addressing the direct-mapped cache, the main memory and the at least one input/output device with addresses having a common form. The at least one input/output device has at least one register which is addressed in alternating fashion with first and second addresses chosen to collide in the direct-mapped cache.

The attainment of the foregoing and related advantages and features of the invention should be more readily apparent to those skilled in the art, after review of the following more detailed description of the invention, taken together with the drawings, in which:

BRIEF DESCRIPTION OF THE DRAWINGS

FIG. 3 is a diagram of memory address format for the system of FIGS. 1 and 2.

FIG. 4 is a flow diagram showing practice of a portion of the method in accordance with the invention using the system shown in FIGS. 1 and 2.

DETAILED DESCRIPTION OF THE INVENTION

Figure 1:
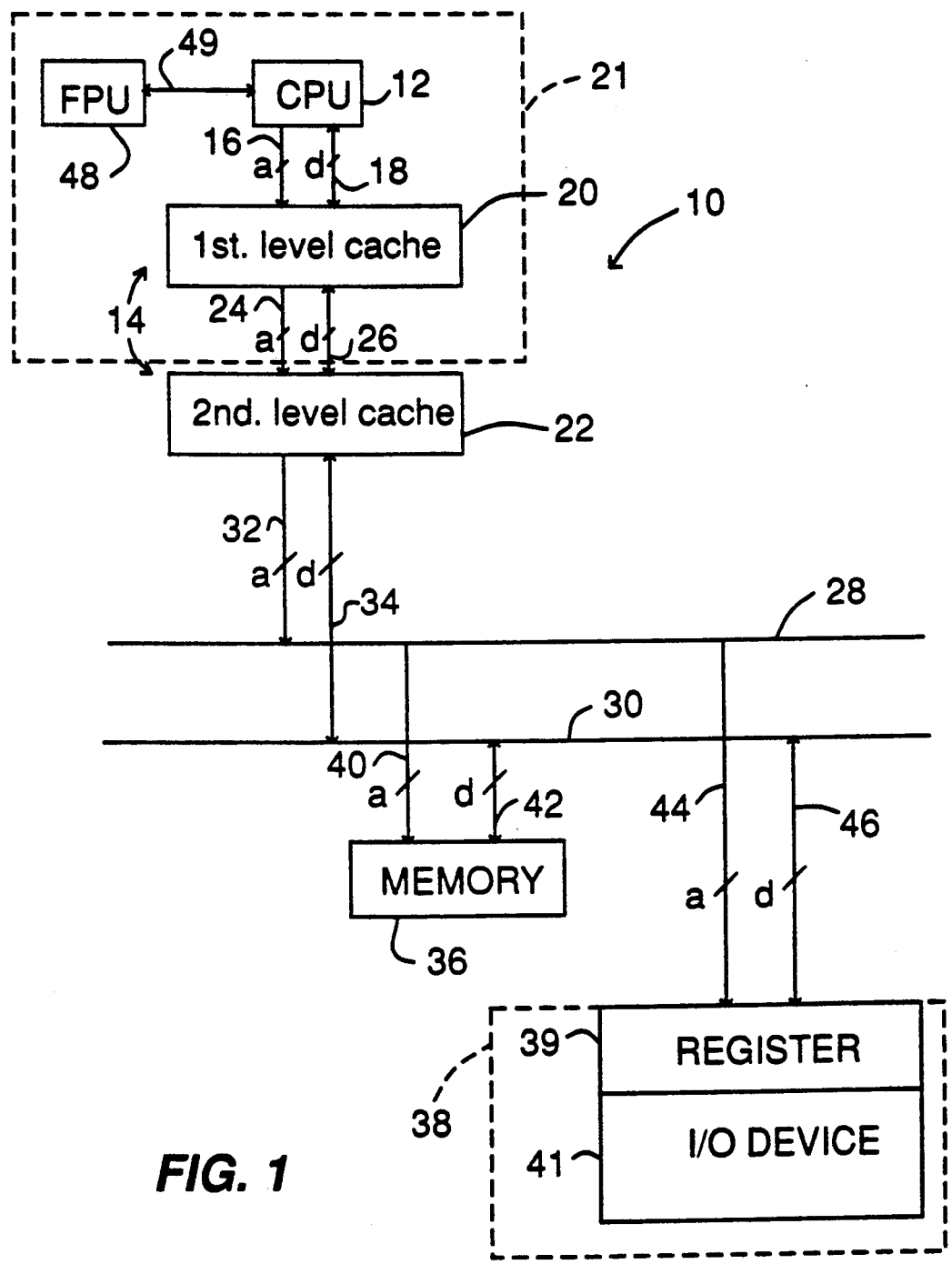
FIG. 1 is a block diagram of a system in accordance with the invention.

Turning now to the drawings, more particularly to FIG. 1, there is shown a system 10 which uses the present invention. The system 10 includes a CPU 12 connected to a direct-mapped cache 14 by address bus 16 and data bus 18. The cache 14 includes a first-level cache 20 connected to a second-level cache 22 by address bus 24 and data bus 26. Cache 14 could be implemented with a one-level cache or with more than two levels of cache, as well. The second-level cache 22 of the cache 14 is connected to address bus 28 and data bus 30 by address bus 32 and data bus 34. The address and data busses 28 and 30 are connected to memory 36 and I/O device 41 by address bus 40, data bus 42, address bus 44 and data bus 46, respectively. In the system 10, access time delay between the CPU 12 and the cache 14 is much smaller than the access time delay between the cache 14 and the memory 36. For example, a successful access or "hit" on the first-level cache takes 1 cycle. A first-level miss and second-level hit would take 10 cycles. A second-level miss, requiring an access to memory 36, would take 100 to 200 cycles. These ratios assume a cycle time on the order of 2 nanoseconds. As the basic cycle time drops, the ratio of 1:10:100 might increase to, for example, 1:30:1000. A floating point unit 48 is connected to the CPU 12 by bus 49.

In practice, the system 10 is implemented with an "integrated" processor, i.e., the CPU 12, floating point unit 48 and first-level cache 20 are provided together on a single integrated circuit chip 21. Doing this in a high-speed technology, such as emitter-coupled logic (ECL) circuits or a gallium arsenide (GaAS) semiconductor integrated circuit provides an extremely low cycle time, i.e., an extremely fast computer. Unfortunately, it is much harder to reduce the latency of access to main memory proportionately. It therefore seems to be generally true that the relative cost of a cache miss in terms of the number of instruction cycles wasted is going to get progressively worse. In late 1970's technology, a cache miss wasted about 1 instruction time. In current technology, a cache miss wastes about 10 instruction times. Within the foreseeable future, cache misses can be expected to cost 100 to 1000 instruction times.

In order to hide some of this cost, the system 10 uses a large second-level cache 22 between the CPU 12 chip and the main memory 36. The access time from the CPU 12 to the cache 22 can be reasonable, since the second-level cache 22 is small enough to be built out of expensive technology. The second-level cache lines 50 (FIG. 3) can be made large enough so that the effective bandwidth from main memory 36 is high enough to satisfy the requirements of the CPU 12, provided that the second-level cache 22 is also large enough to have a sufficiently high hit rate.

Studies indicate that, as caches get large, one gets better performance for a given investment using large direct-mapped caches 20 and 22 rather than not-quite-so-large associative caches. The increased hit rate from associative caches is not significant, but the increase in cache access time is significant.

In order to make the caches 20 and 22 fast, it is desirable to avoid excess complexity. One source of complexity is that required to maintain coherency between the cache contents and the actual value of the data. In a multiprocessor system, the multiple caches involved must be kept consistent somehow. However, there are many reasons why one would prefer to build a uniprocessor, and in a uniprocessor there is no need to maintain consistency between the caches of several CPUs. However, it is still necessary to maintain cache consistency if the system includes I/O devices 41 that appear as memory cells, i.e., memory cells whose values can change without being written by the CPU 12 via the cache 14. If this can be done without excess hardware complexity, the price and/or performance of the system 10 will be improved.

In the system 10, I/O interface 38 decodes physical memory addresses and responds to addresses in specific ranges using at least one register 39. Each I/O device register 39 responds to one of two distinct physical addresses, which are chosen to collide in the data cache 14. I/O software alternates between the two addresses for the register 39 instead of alternating between a device register address and a reserved-region address as in prior art systems. This means that every cache 14 refill or write-back operation is "useful," in the sense that it references the device register 39 in question. This approach works without changes to the instruction architecture and is simple to implement and program. Polls (read or write) require only one cache-refill latency. PI/O read transfer proceeds at full memory-system bandwidth.

Arranging for the I/O interface 38 to respond in this manner is not difficult. Since the direct-mapped cache 14 is a power of two in size, any pair of addresses that differ in at least one bit numbered higher than the base-2 logarithm of the cache 14 size will collide. The I/O interface 38 ignores one such address bit, such as the high order bit of the I/O region of the physical address space, to produce this result. If the bit to be ignored is chosen carefully, neither the interface 38 hardware nor the I/O software need be cognizant of the actual cache 14 size.

Figure 2:
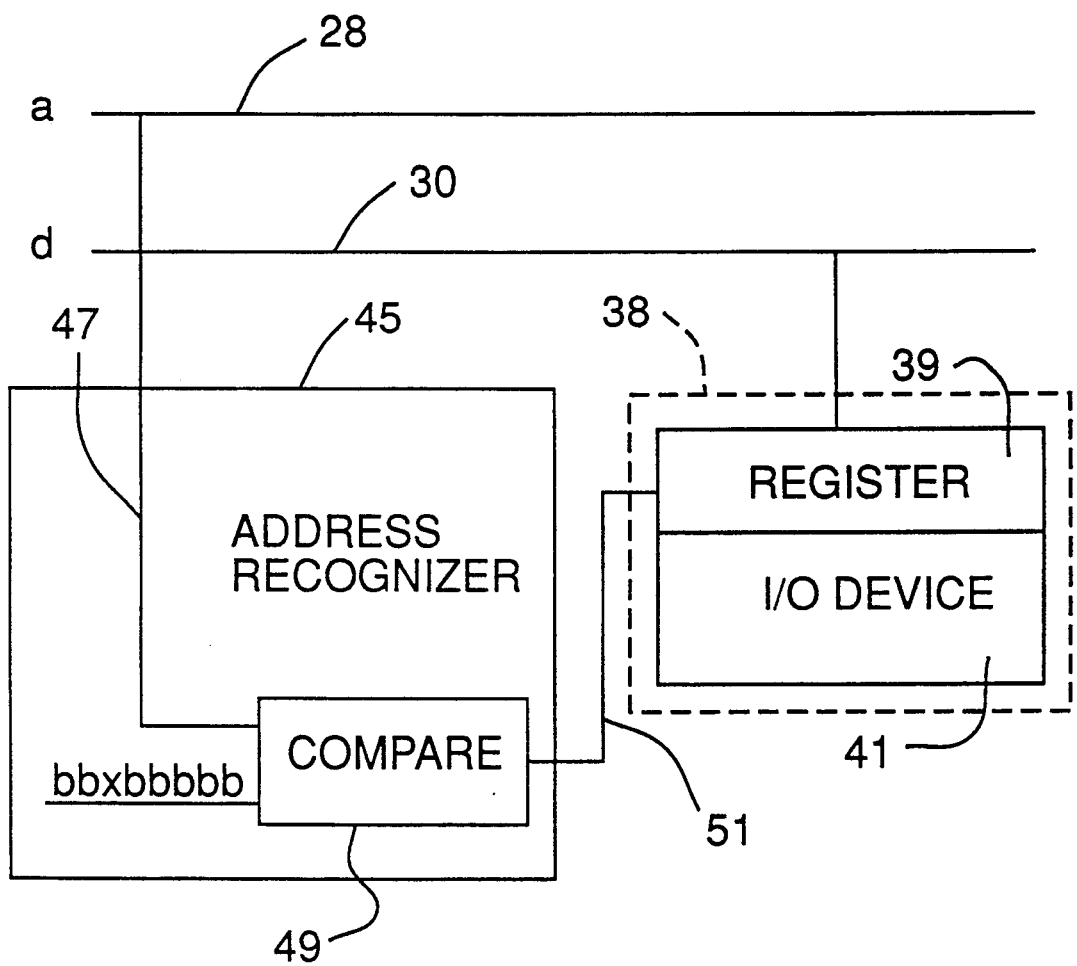
FIG. 2 is a more detailed block diagram of a portion of the system of FIG. 1.

FIG. 2 shows one form of hardware to implement this form of addressing. An address recognizer 45 is connected to the address bus 28 by bus 47. Addresses on the address bus 28 are supplied to a comparator 49 where they are compared with a constant value bbxbbbbb representing the address of the register 39, where the 'x' bit of the value represents a "don't care" value, so that it is ignored in the address. The output of the comparator 49 is connected as a control input to enable the register 39. This means that two different addresses on the address bus 28 will select the register 39, so that data on the data bus 30 will be supplied via register 39 to the I/O device 41. While a single register 39 is suitable for the invention, the register 39 can also be implemented as a large number of registers in the form of a buffer memory, so that the register 39 can be replicated many times for a single I/O device 41.

FIGS. 3 and 4 show memory address format 52 used in the system 10 and how lines 50 of cache 14 are mapped to main memory 36 in system 10. The memory address format 52 has a 12-bit tag field 54, a 12-bit line number field 56 and an 8-bit byte offset field 58. As shown, cache lines 50 numbered 0 through 4095 map to main memory lines 60 numbered 0 through 4095, 4096 through 8,191, and so forth, depending on their tag 62. Lines 50 and 60 are 256-byte lines, requiring the 8-bit byte offset field 58. The 4096-line cache 14 requires the 12-bit line number field 56. This memory address format is representative of practice of the invention, but a wide variety of other memory address formats could be used.

Further understanding of the invention is provided by considering four cases of I/O operations in the system 10: reading a status register, writing a status register, doing a data input PI/O transfer, and doing a data output PI/O transfer. In the following discussion, examples are given in C programming language code. The invention can, of course, be practiced with any suitable programming language.

Figure 5:
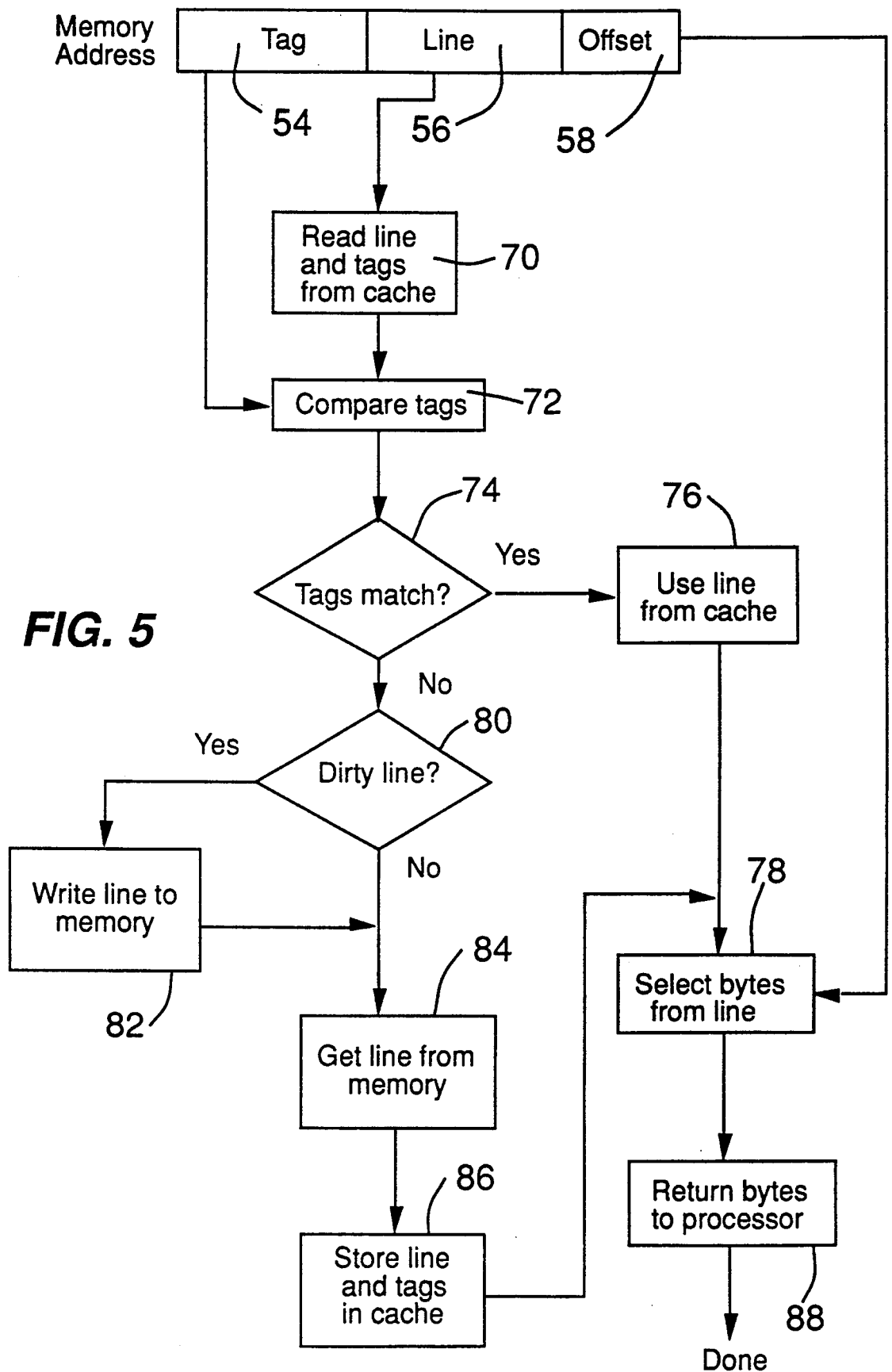
FIG. 5 is a flow chart showing practice of an embodiment of the method of the invention with the system of FIGS. 1 and 2.
Figure 6:
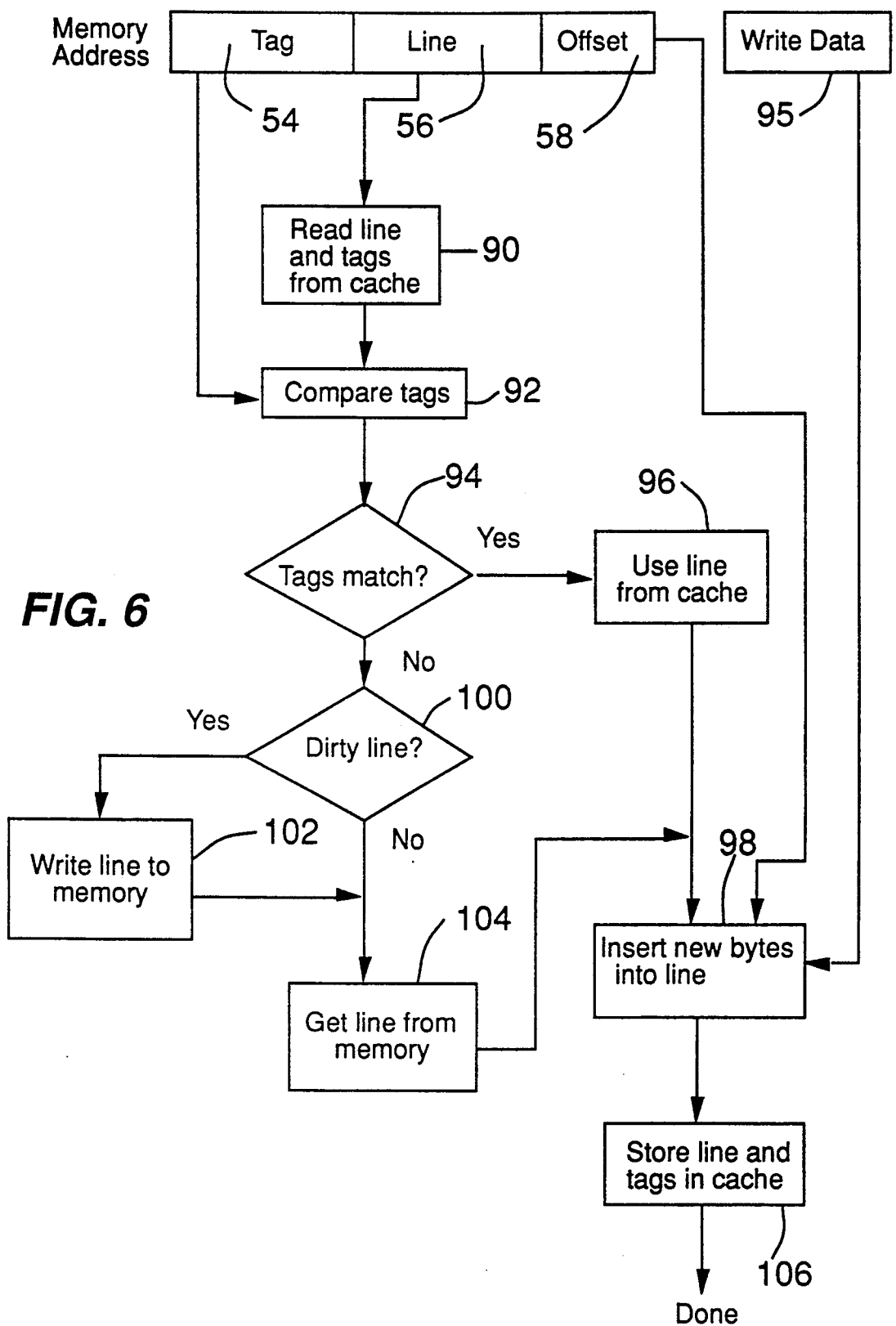
FIG. 6 is another flow chart showing practice of another embodiment of the method of the invention with the system of FIGS. 1 and 2.

FIGS. 5 and 6 provide background on the operation of a direct-mapped write-back cache, necessary in understanding how PI/O operations depend on cache operation. FIG. 5 is a flow chart showing the steps in a read operation from the direct-mapped cache 14 using write-back. The line number 56 and tag 54 from address 52 supplied by the CPU 12 are used at step 70 to select the appropriate line 50 from the cache 14. The tag of the address to be read is compared at 72 with the tag 62 found in the cache 14. If the tags match at 74, the line number 56 from the cache 14 is used at 76 with the byte offset 58 to select bytes from the specific line 50 of the cache 14 at 78. If the tags do not match at 74, a test is run for a "dirty" line 50 at 80. A dirty line is a line in the cache 14 whose value has been modified by a write operation from the CPU 12, and the new value has not yet been updated in main memory 36. If the line 50 is dirty, the line is written to memory 36 at 82. If the line 50 is not dirty, or after the line is written to memory if dirty, a line 60 is obtained from memory 36 at 84. The line 60 and tags 62 are stored in the cache 14 at 86. The line number 56 from the cache 14 and the byte offset 58 is then used to select bytes from the line 50 at 78 as before. The selected bytes are then returned to the processor 12 at 88.

When reading a single I/O interface 38 register 39, the I/O software executes the following:

```
int *regaddr;
int value;
...
value = regaddr[0];
regaddr = XOR(regaddr, COLLIDEMASK);
``` where COLLIDEMASK is a bitmask with a 1-bit where the I/O interface 38 ignores the physical address bit, and 0-bits elsewhere. The I/O software thus alternates between the two views of the interface 38, and never requires an extra cache refill until some other activity requires that cache line 50.

When reading several registers that may safely be read in a single operation, the I/O software executes the following:

```
value0 = regaddr[0];
value1 = regaddr[1];
value2 = regaddr[2];
regaddr = XOR(regaddr, COLLIDEMASK);
```

This requires only one cache refill for the three reads, if all three registers map to the same cache line 50. Use of an uncached address mechanism here would require three refills.

As shown in FIG. 6, a write operation on the direct-mapped cache 14 using write-back is similar. The line number 56 and tags 54 are used at step 90 to select the appropriate line 50 from the cache 14. The tag of the address to be written is compared at 92 with the tag 62 found in the cache 14. If the tags match at 94, the line 50 is chosen at 96 for data to be written at 95 with the byte offset 58 to insert new bytes into the line 50 at 98. If the tags do not match at 94, a test is run for a dirty line 50 at 100. If the line 50 is dirty, the line is written to memory 36 at 102. If the line 50 is not dirty, or after the line is written to memory if dirty, a line 60 is obtained from memory 36 at 104. The line 60 and tags 62 are stored in the cache 14 at 106. The line number 56 from the cache 14 and the byte offset 58 is then used to write data on the line 50 at 98 and store the line 60 and tags 62 in the cache 14 as before.

When the I/O software is writing an I/O device register 39 in the system 10, it executes the following:

```
regaddr[0] = value;
regaddr = XOR(regaddr, COLLIDEMASK);
value = regaddr[0];
```

The second reference is necessary to cause the line to be written out of the cache 14, since the cache 14 is not write-through. Note that because the normal caching mechanism is in use, and because the cache line is wider than the register 39, the cache system will insist on reading each cache line 50 before writing it. This results in twice the latency as would be necessary with explicit cache management instructions. Note also, however, that the next write access to this register 39 will probably proceed without requiring an additional refill operation, since the second reference will have resulted in the corresponding address being valid in the cache 14. If the next access to this I/O interface 38 might be a read reference, and the contents of the device register 39 might change in the interim, it is necessary to alternate the address once again. As with the read case, if one can safely write several registers at once that share the same cache line 50, the address alternation may be postponed, thus amortizing the overhead.

An example of a PI/O read data transfer is reading a buffer from a disk controller. In traditional PI/O designs, the device's data buffer register is one word wide. For best performance, the present invention uses a buffer register instead that is as wide as a cache line 50. This buffer register can be treated as N adjacent registers, where N=line size/word size. To transfer a disk buffer, one would write:

```
int buffer[BUFERSIZE];
linewords = LINESIZE/WORDSIZE;
for (i = 0; i < BUFERSIZE; i += linewords) {
    for (j = 0; j < linewords; j++) {
        buffer[i+j] = regaddr[j];
    }
    regaddr = XOR(regaddr, COLLIDEMASK);
}
```

The inner loop requires one cache refill for each instance of the entire inner loop (not each iteration) and transfers one line of data from the device to a memory buffer. One should strive to ensure that the buffer does not collide with the device register, at least in the second-level cache 22. Since all the cache refills are for useful data, the transfer proceeds more or less at full available bandwidth.

A PI/O write data transfer, such as writing a disk buffer, assuming a write-back cache, executes the following:

```
int buffer[BUFERSIZE];
linewords = LINESIZE/WORDSIZE;
for (i = 0; i < BUFERSIZE; i += linewords) {
    for (j = 0; j < linewords; j++) {
        regaddr[j] = buffer[i+j];
    }
    regaddr = XOR(regaddr, COLLIDEMASK);
}
dummy = regaddr[0];
    /* cause "dirty miss" on last line */
```

A dirty miss is a reference to the cache 14 that cannot be satisfied by the current contents of the cache, and the line that will be used to hold the referenced word once it is fetched from main memory is currently dirty. That is, the line contains a value that must be written back to main memory 36 before the line can be used to hold the value needed for the current reference. Because the cache system will do a refill on the first write to each new cache line 50, write transfers done in this way will "waste" about half of the memory bandwidth doing useless reads from the device 41 register 39. This is worse than the performance obtained with explicit cache management instructions, which have no wasted reads, but better than that obtained with the reserved-region method, which has two wasted reads per line written. Also, note that the device's data buffer register must be designed so that these cache-filling reads do not cause trouble. Such trouble can arise from the practice in some cases of designing device registers so that a read reference has side-effects, i.e., reading the register causes some action besides simply the return of the value. In some cases, the side-effects are consequences of poor design decisions, such as when reading from the register causes the device to start a physical operation. However, often one natural approach is to use one data register as a "window" on an entire buffer. Each time the register is read, it automatically steps through the buffer. In fact, the above examples assume this organization. In the read-transfer case, since we are arranging for exactly the right number of reads from the register, and in the right order, there is no problem. In the write-transfer case, we are doing exactly the right number of writes, but the cache may also be doing refill reads on each of the dirty misses. We must therefore design the write buffer register so that read references, unlike write references, do not "step" it through the underlying buffer memory.

It should be apparent to those skilled in the art that various changes in form and details of the invention as shown and described may be made. It is intended that such changes be included within the spirit and scope of the claims appended hereto.

What is claimed is:

1. A data processing system, which comprises:
a central processing unit;
a main memory;
at least one input/output device;
a direct-mapped cache connected between said central processing unit and said main memory and between said central processing unit and said at least one input/output device;
wherein said at least one input/output device having at least one register being addressed by a first address and a second address; both the first and second addresses being chosen to collide in said direct-mapped cache; said direct-mapped cache, said main memory and said at least one input/output device being addressed by means of addresses having a common format; and said central processing unit operates under control of an input/output program to address said at least one input/output device by alternately addressing the first and second addresses, with the first and second addresses chosen to collide in said direct-mapped cache.

2. The data processing system of claim 1 in which said direct-mapped cache comprises a first-level cache and a second-level cache.

3. The data processing system of claim 2 in which an access time between said central processing unit and said first-level cache is less than an access time between said second-level cache and said main memory.

4. The data processing system of claim 2 additionally comprising a floating point unit connected to said central processing unit.

5. The data processing system of claim 4 in which said central processing unit, said floating point unit and said first-level cache are implemented together on a single integrated circuit chip.

6. The data processing system of claim 1 in which said central processing unit is connected to said direct-mapped cache by a first address bus and a first data bus and said direct-mapped cache is connected to said main memory and to said at least one input/output device by a second address bus and a second data bus.

7. The data processing system of claim 1 in which said system operates with memory addresses having a format including a tag field, a line field and a byte offset field.

8. The data processing system of claim 7 in which memory addresses for said at least one input/output device have a bit position ignored by said at least one input/output device and said central processing unit operates with a bitmask to use the bit position ignored by said at least one input/output device to address said at least one input/output device alternately with the first and second addresses.

9. The data processing system of claim 8 in which said cache and a register of said at least one input/output register have equal line sizes.

10. The data processing system of claim 1 in which said at least one input/output device is connected to said direct-mapped cache by an address bus and a data bus, said system additionally comprising an address recognizer connected to said address bus, said address recognizer including a comparator connected to receive addresses on said address bus as a first input and a value which will address the at least one register as a second input for comparison with the first input, said comparator being configured to ignore a bit in the addresses, an output of said comparator being connected as a control input to the at least one register, the at least one register being connected to said data bus.

11. The data processing system of claim 1 in which the at least one register of said at least one input/output device is a buffer memory comprising a plurality of registers.

12. A data processing method, comprising the steps of:
providing a data processing system including a central processing unit, a main memory, at least one input/output device, a direct-mapped cache connected between the central processing unit and the main memory and between the central processing unit and the at least one input/output device, with the at least one input/output device having at least one register being addressable by first and second addresses chosen to collide in the direct-mapped cache;

addressing the direct-mapped cache, the main memory and the at least one input/output device with addresses having a common format; and addressing the at least one register of the at least one input/output device with the first address and the second address by alternately addressing the first and second addresses, with the first and second addresses chosen to collide in the direct-mapped cache.

13. The data processing method of claim 12 in which the direct-mapped cache is provided with a first-level cache and a second-level cache.

14. The data processing method of claim 13 in which an access time between the central processing unit and the first-level cache is less than an access time between the second-level cache and the main memory.

15. The data processing method of claim 12 in which the cache, the main memory and the at least one register of the at least one input/output device are addressed with memory addresses having a format including a tag field, a line field and a byte offset field.

16. The data processing method of claim 15 in which memory addresses for the at least one register of the at least one input/output device have a bit position ignored by the at least one register of the at least one input/output device, the method further comprising the step of examining the memory addresses with a bitmask to use the bit position ignored by the at least one register of the at least one input/output device to address the at least one register of the at least one input/output device alternately with the first and second addresses.

17. The data processing method of claim 16 in which the cache and the at least one register of the at least one input/output device are provided with equal line sizes.

18. The data processing method of claim 12 in which the at least one register of the at least one input/output device is addressed with the first address and the second address by comparing addresses with a value representing the address of the at least one register, ignoring one bit in the first address and the second address while comparing addresses, and enabling the at least one register when the value and the addresses match.

19. The data processing method of claim 12 in which the at least one register is a buffer memory comprising a plurality of registers.

* * * * *